No. 778,997. PATENTED JAN. 3, 1905.
G. S. PARKER.
FEEDER FOR FOUNTAIN PENS.
APPLICATION FILED MAY 9, 1904.

Witnesses.
Geo. C. Davison.
W. W. Leach.

Inventor,
George S. Parker,
By Barton & Tanner,
Attorneys.

No. 778,997. Patented January 3, 1905.

UNITED STATES PATENT OFFICE.

GEORGE S. PARKER, OF JANESVILLE, WISCONSIN.

FEEDER FOR FOUNTAIN-PENS.

SPECIFICATION forming part of Letters Patent No. 778,997, dated January 3, 1905.

Application filed May 9, 1904. Serial No. 206,976.

*To all whom it may concern:*

Be it known that I, GEORGE S. PARKER, a citizen of the United States, residing at Janesville, in the county of Rock and State of Wisconsin, have invented a certain new and useful Improvement in Feeders for Fountain-Pens, of which the following is a full, clear, concise, and exact description.

My invention relates to a fountain-pen, and its object is to provide an improved construction of the feeder whereby surplus ink will be collected near the point of the pen while the pen is in use, but will be positively drawn back into the barrel when the pen is inverted.

I will describe my invention by reference to the accompanying drawings, wherein—

Figure 1:
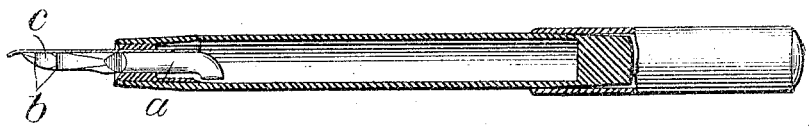
Figure 2:
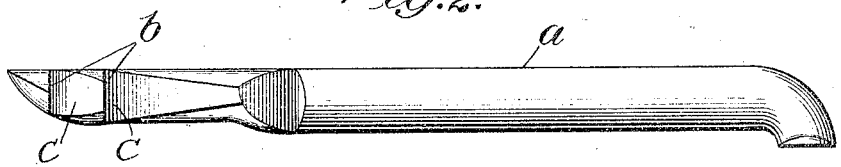
Figure 3:
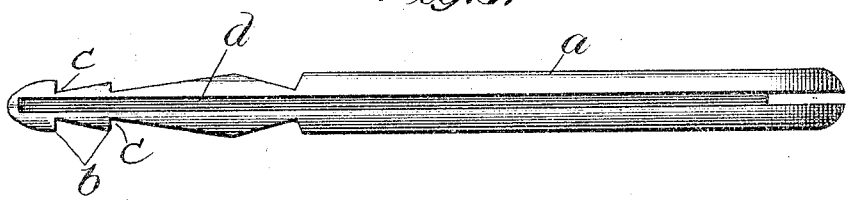
Figure 4:
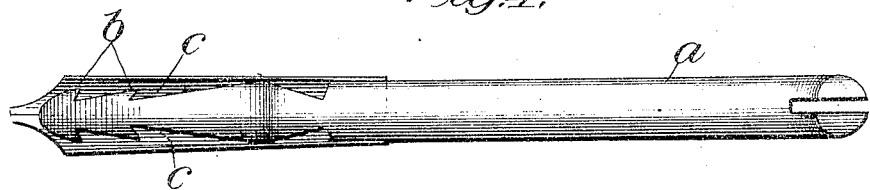

Figure 1 is a longitudinal sectional view of a fountain-pen equipped with my improved feeder. Fig. 2 is a side view of the feeder. Fig. 3 is a top view thereof; and Fig. 4 is a bottom view of the pen and feeder, showing a slightly-modified form.

The same letters of reference are used to designate the same parts wherever shown.

The feeder of my invention consists of a bar $a$, held in the nozzle with its upper surface fitting closely against the under side of the gold pen and its rear end communicating with the inside of the barrel or ink-reservoir. The portion of the feeder underneath the pen is provided with one or more supplementary ink cups or reservoirs at the sides of the feeder near the tip, and passages are provided in the sides of the feeder leading rearwardly from said supplementary ink-cups. The ink cups and passages are preferably formed by recesses $c$ $c$ in the sides of the feeder near the end, which begin at the rear and gradually deepen toward the tip of the feeder and end in abrupt shoulders $b$ $b$. The deep recesses back of the shoulders form the supplementary ink-cups, which are adapted to collect surplus ink near the point of the pen and prevent it from dropping off. As shown, the forward end of the feeder may be gradually narrowed in width or tapered toward the tip; but the tapered portion ends at the abrupt laterally-projecting shoulders $b$ $b$. I prefer to provide more than one lateral recess in each side of the feeder forming a series of steps, as shown.

The passages extending rearwardly from said supplementary ink-cups are formed by the rearwardly-narrowing spaces between the sides of the feeder and the inner sides of the pen. The object of these passages is to provide means for positively returning the ink from the supplementary ink-cups to the barrel when the pen is inverted.

Any fountain-pen will tend to discharge ink more freely when it is first used, due to the heat of the hand expanding the air in the barrel. The ink will also flow much more freely when the reservoir is nearly empty. If the feeder is not provided with such supplementary ink-cups as I have described, the surplus ink, which has been forced out more rapidly than it could be used, will collect in a large drop at the point of the pen and finally drop off, making a blot on the paper.

With my improved construction the supplementary ink cups or holders formed by the laterally-projecting shoulders $b$ $b$ at the forward ends of the recesses $c$ $c$ will act to hold the surplus ink before it reaches the point of the pen. I have further provided means for positively returning this surplus ink to the barrel when the pen is inverted after use, such means consisting of the rearwardly-narrowing passages which are provided between the sides of the feeder and the inner sides of the pen, communicating around the surface of the feeder with the central longitudinal ink-duct $d$ therein.

The feeder of my improved construction thus possesses decided advantages in that it not only provides means for collecting the surplus ink before it reaches the point of the pen while the pen is in use, but also prevents this collected ink from remaining at the point of the pen or spreading around the mouth of the barrel by positively draining the supplementary ink cups or reservoirs when the pen is inverted.

I claim—

1. The combination with the ink-reservoir and the pen, of a feeder lying against the under side of the pen and communicating with the reservoir at the rear, said feeder having a central longitudinal ink-channel in the side next the pen, and recesses in the sides of the feeder, said recesses being gradually deepened toward the tip of the feeder and ending in abrupt shoulders; whereby supplemental ink-reservoirs are provided to collect surplus ink near the point of the pen, said reservoirs having rearwardly-narrowing passages formed by said lateral recesses and the inner sides of the pen, whereby said supplemental reservoirs are quickly drained when the pen is inverted, as described.

2. A feeder for fountain-pens having its forward portion gradually tapered toward the tip, but having abrupt laterally-projecting shoulders near the tip at the forward end of said tapered section.

3. The combination with a fountain-pen, of a feeder having a central longitudinal ink-channel in its upper surface, adapted to come against the under side of the pen, a supplementary ink cup or holder in the side of said feeder near the tip, and a passage in the side of the feeder, leading rearwardly from said supplementary ink-cup; whereby surplus ink is collected near the point of the pen while the pen is in use, but is positively drawn back through said passage when the pen is inverted as described.

In witness whereof I hereunto subscribe my name this 3d day of May, A. D. 1904.

GEO. S. PARKER.

Witnesses:
  MAMIE GARVIN,
  W. F. PALMER.